(12) United States Patent
Kim

(10) Patent No.: US 8,593,706 B2
(45) Date of Patent: Nov. 26, 2013

(54) ILLUMINATING LIGHT SOURCE, SCANNER MODULE EMPLOYING THE SAME, AND IMAGE SCANNING APPARATUS EMPLOYING THE SCANNER MODULE

(75) Inventor: Kyung-rok Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1112 days.

(21) Appl. No.: 11/762,877

(22) Filed: Jun. 14, 2007

(65) Prior Publication Data
US 2008/0170113 A1    Jul. 17, 2008

(30) Foreign Application Priority Data
Jan. 15, 2007 (KR) .................. 10-2007-0004350

(51) Int. Cl.
*H04N 1/04* (2006.01)

(52) U.S. Cl.
USPC ............ 358/475; 358/474; 358/497; 358/498

(58) Field of Classification Search
USPC ........... 358/475, 474, 497, 498; 313/485, 491
See application file for complete search history.

(56) References Cited

U.S. PATENT DOCUMENTS

| | | | | |
|---|---|---|---|---|
| 4,695,763 A * | 9/1987 | Ogasawara et al. | ............ | 313/487 |
| 4,871,941 A * | 10/1989 | Dobashi et al. | ................ | 313/485 |
| 5,537,240 A | 7/1996 | Wun et al. | | |
| 5,973,815 A | 10/1999 | Schissler et al. | | |
| 6,034,476 A | 3/2000 | Tamura | | |
| 6,402,343 B1 | 6/2002 | Vollkommer et al. | | |
| 6,493,061 B1 * | 12/2002 | Arita et al. | ....................... | 355/41 |
| 6,917,452 B2 * | 7/2005 | Beeman | .......................... | 358/475 |
| 7,233,419 B2 * | 6/2007 | Chang | ........................... | 358/475 |
| 2002/0018166 A1 * | 2/2002 | Matsumoto et al. | .......... | 349/141 |
| 2002/0054388 A1 | 5/2002 | Uchida | | |
| 2002/0113550 A1 * | 8/2002 | Nakamura et al. | ............ | 313/506 |
| 2002/0163305 A1 | 11/2002 | Hitzschke et al. | | |
| 2004/0061689 A1 * | 4/2004 | Ito | ................. | 345/175 |
| 2004/0251843 A1 * | 12/2004 | Kang et al. | ................. | 315/169.3 |

(Continued)

FOREIGN PATENT DOCUMENTS

| | | |
|---|---|---|
| EP | 0 481 151 A2 | 10/1991 |
| EP | 0 871 203 | 10/1998 |

(Continued)

OTHER PUBLICATIONS

Extended European Search Report issued on Jun. 17, 2009, by the European Patent Office in European Patent Application No. 07122290.5 (7 pages, in English).

(Continued)

*Primary Examiner* — Houshang Safaipour
(74) *Attorney, Agent, or Firm* — Staas & Halsey LLP

(57) ABSTRACT

An illuminating light source, and a scanner module and an image scanning apparatus including the same. The illuminating light source includes: a vacuum tube have a cylindrical shape, is filled with a discharging gas, and has a light emitting portion disposed in a lengthwise direction thereof; a discharging electrode disposed upon the vacuum tube, and having a width that increases from a center portion to end portions thereof; and a fluorescent body disposed within the vacuum tube, to absorb first light beams emitted by the discharging gas and to emit second light beams having a longer wavelength than the first light beams, with the second light beams being illuminated through the light emitting portion.

26 Claims, 9 Drawing Sheets

(56) References Cited

U.S. PATENT DOCUMENTS

| | | |
|---|---|---|
| 2005/0104080 A1* | 5/2005 | Ichihara et al. ............ 257/98 |
| 2005/0254101 A1 | 11/2005 | Chen |
| 2006/0220521 A1* | 10/2006 | Yang et al. ............ 313/491 |
| 2007/0090740 A1 | 4/2007 | Hiraoka et al. |
| 2008/0088227 A1* | 4/2008 | Lee ............ 313/504 |
| 2009/0141132 A1* | 6/2009 | Lehmann et al. ........ 348/207.99 |

FOREIGN PATENT DOCUMENTS

| | | |
|---|---|---|
| EP | 0 871 205 | 10/1998 |
| JP | 10-284009 | 10/1998 |
| JP | 2005-326744 | 11/2005 |
| KR | 1997-55711 | 10/1997 |

OTHER PUBLICATIONS

Korean Office Action issued Apr. 8, 2011 in corresponding Korean Patent Application 10-2007-0004350.

Chinese Office Action issued May 25, 2011 in corresponding Chinese Patent Application 200710198527.X.

Chinese Office Action issued Aug. 31, 2011 in corresponding Chinese Patent Application 200710198527.X.

Chinese Office Action mailed Feb. 22, 2012 issued in corresponding Chinese Patent Application No. 200710198527.X.

Chinese Office Action issued Oct. 28, 2010 in corresponding Chinese Patent Application 200710198527.X.

\* cited by examiner

ILLUMINATING LIGHT SOURCE, SCANNER MODULE EMPLOYING THE SAME, AND IMAGE SCANNING APPARATUS EMPLOYING THE SCANNER MODULE

CROSS-REFERENCE TO RELATED APPLICATIONS

This application claims all benefits accruing under 35 U.S.C. §119 from Korean Patent Application No. 2007-4350, filed on Jan. 15, 2007, in the Korean Intellectual Property Office, the disclosure of which is incorporated herein by reference.

BACKGROUND OF THE INVENTION

1. Field of the Invention

Aspects of the present invention relate to an illuminating light source for a scanner module, to read information from an object, and an image scanning apparatus employing the scanner module.

2. Related Art

As shown in FIG. 1, a scanner module generally illuminates an object, e.g., a document disposed on a cover glass 3, with light from a light source 1. A scanner module generally forms an image with the light reflected from the document, through an imaging lens 5 and onto an image pickup device 7 (e.g. sensor). As shown in FIGS. 2 and 3, the amount of light picked-up from the image decreases from the center toward the edges of the image, due to the optical characteristics of the imaging lens 5.

As shown in FIG. 2, the amount of distributed light, i.e. the illumination, of the surface of a document is uniform across the document. Due to the optical characteristics of the imaging lens 5, the illumination of an image forming surface, of the image pickup device 7, is the highest in the center of the image forming surface and gradually decreases toward the edges thereof, due to the properties of the lens 5

The decrease in the amount of light focused through the edges of the lens 5 (reaching the edges of image pickup device 7) is represented as a function of an angle θ formed between an image reading unit (not shown) and the imaging lens 5. Generally, the decrease in the light intensity is proportional to $\cos^4 \theta$. That is, as the angle θ becomes larger, the light amount is drastically decreased. Accordingly, the intensity of a signal inputted to the image pickup device 7 becomes weaker toward the edges, and the signal to noise ratio decreases. The decreased light amount causes a gradation difference between the center and the edges of an image.

To narrow the difference in the light amount, a conventional method, of decreasing the light amount of the center, is employed, as shown in FIG. 4. Referring to FIG. 4, the conventional illuminating light source includes: a lamp holder 10; a lamp 11, which is mounted in the lamp holder 10 and emits light; and a reflection plate 13, which is mounted in the lamp holder 10 and reflects incident light, so that the light emitted by the lamp 11 is directed in a predetermined direction. A non-reflective pattern 13a is formed in a predetermined region of the reflection plate 13, to decrease the light amount from the center of an image and to reduce the light amount difference. The non-reflective pattern 13a has a curvature that bocks more light from the center of an image than from the edges of an image.

If the illuminating light source is provided as shown in FIG. 4, a portion of the light emitted by the lamp 11 is blocked, thereby lowering light efficiency. A portion of the light, emitted to the non-reflective pattern 13a of the reflection plate 13, is absorbed by the non-reflective pattern 13a. Thus, the temperature of the reflection plate 13 increases, due to the absorption of thermal energy. Also, the non-reflective pattern 13a is printed in the reflection plate 13, thereby increasing production costs.

SUMMARY OF THE INVENTION

Accordingly, it is an aspect of the present invention to provide an illuminating light source, having an improved an electrode configuration, that compensates for the decreased light amount from the edges of an image. Also provided, is a scanner module employing the same, and an image scanning apparatus employing the scanner module.

The foregoing and/or other aspects of the present invention can be achieved by providing an illuminating light source, comprising: a cylindrical vacuum tube filled with a discharging gas, which has a light emitting portion extending in a lengthwise direction thereof; a discharging electrode disposed on the vacuum tube, which has a width that increases from a center portion to end portions thereof, along the length of the vacuum tube; and a fluorescent body, which is formed within the vacuum tube, and absorbs shorter wavelength light, emitted by the discharging gas, and emits longer wavelength light. The longer wavelength light is emitted through the light emitting portion.

According to an aspect of the invention, the discharging electrode can have a thickness that increases from the center portion to the end portions. The discharging electrode can have a corrugated shape, with the period of the corrugations decreasing from the center portion to the end portions.

The discharging electrode can comprise a first discharging electrode and a second discharging electrode opposing the first electrode. According to an aspect of the invention, the illuminating light source further comprises a protection tube enclosing the vacuum tube and the discharging electrode.

Aspects of the present invention encompass a scanner module, comprising: an illuminating light source according to the above description, which illuminates an object; a sensor to detect light from a scanned object; and an imaging lens, disposed between the object and the sensor, to focus an image of the object onto the sensor. Aspects of the present invention encompass an image scanning apparatus, comprising: a scanner module according to the above description; and an image processor to processes image information provided by the scanner module.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims, when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
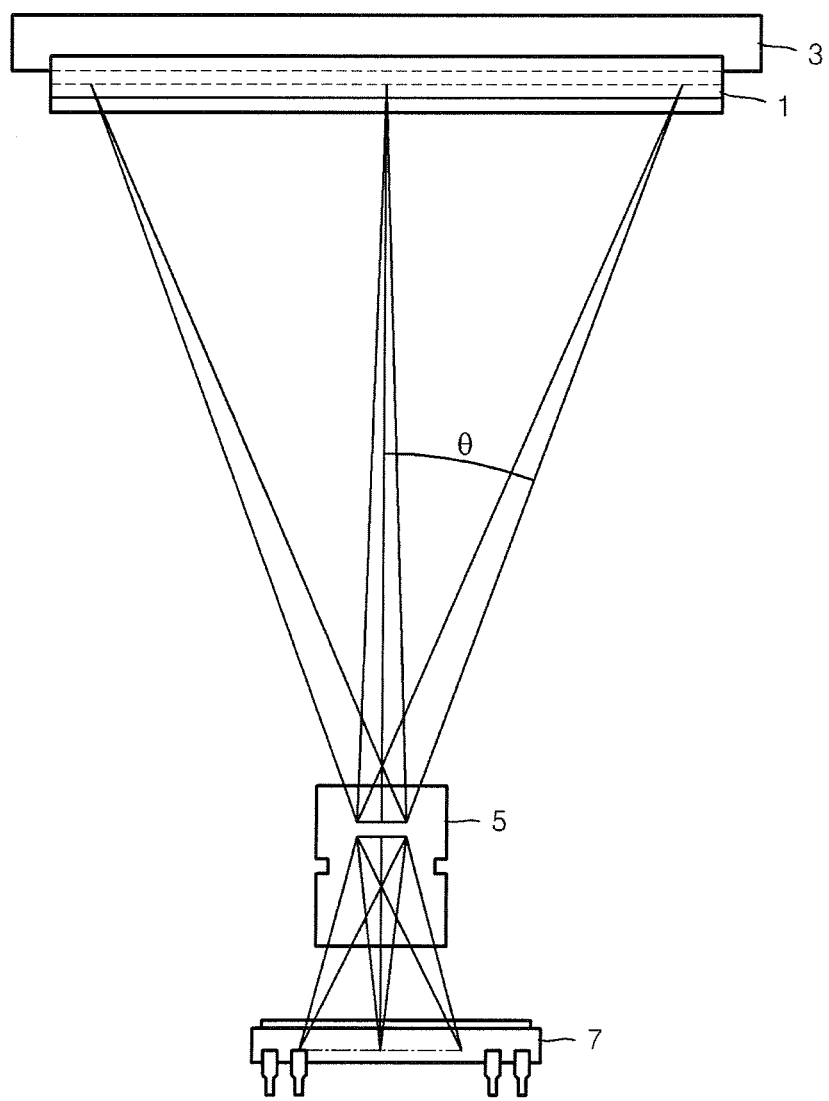
FIG. 1 is a schematic view of a conventional scanner module.
Figure 2:
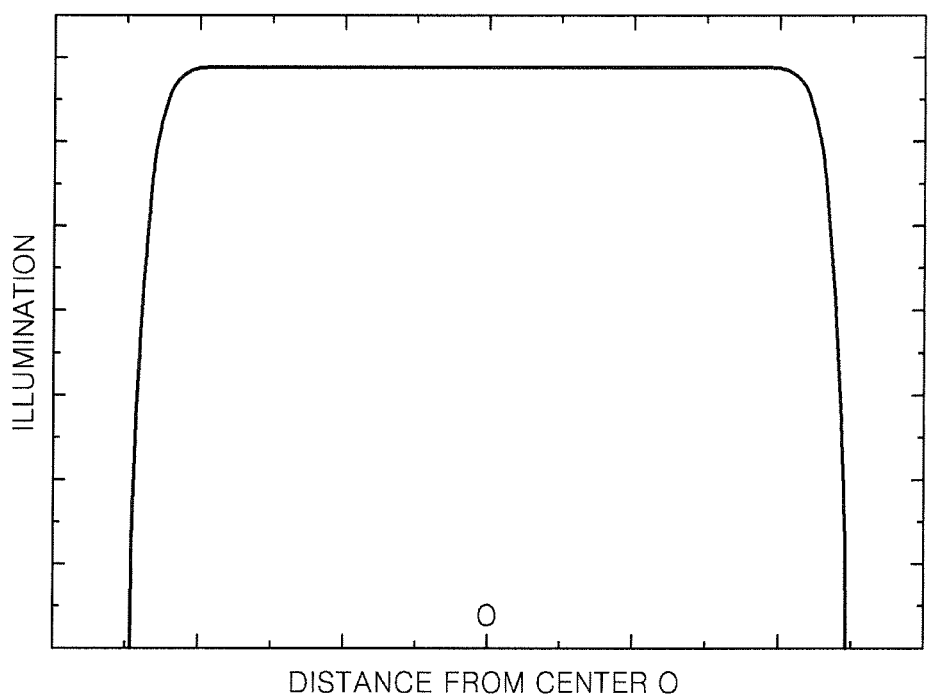
FIG. 2 is a graph which illustrates a light intensity distribution on a document surface.
Figure 3:
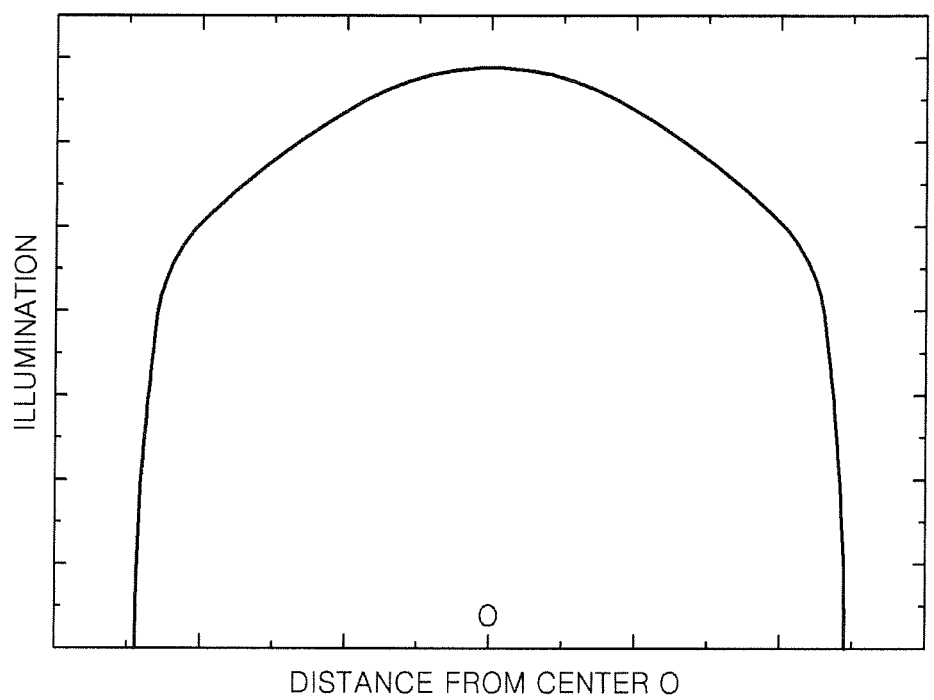
FIG. 3 is a graph which illustrates a light intensity distribution on an image pickup surface.

Reference will now be made in detail to the various embodiments of the present invention, examples of which are illustrated in the accompanying drawings, wherein like reference numerals refer to the like elements throughout. The embodiments are described below in order to explain the present invention, by referring to the figures.

Figure 5:
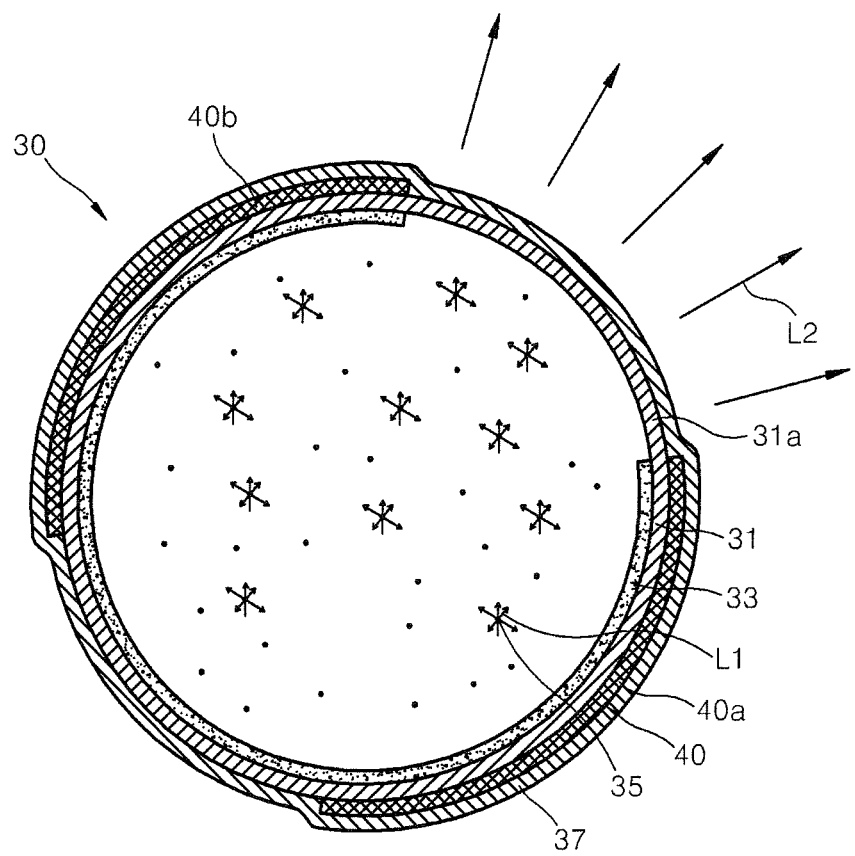
FIG. 5 is a sectional view of an illuminating light source, according to an example embodiment of the present invention.

FIG. 5 is a sectional view of an illuminating light source, according to an example embodiment of the present invention. As shown in FIG. 5, includes a vacuum tube 31 filled with a discharging gas 35, a discharging electrode 40 disposed along the perimeter of the vacuum tube 31, and a fluorescent body 33 disposed within the vacuum tube 31. The vacuum tube 31 has a cylindrical shape and includes a light emitting portion 31 extending along the length of the vacuum tube 31.

The discharging electrode 40 electrically excites the discharging gas 35 in the vacuum tube 31. The discharging gas can be a rare gas that emits light in response to electrical stimulation. According to an example embodiment of the present invention, the discharging electrode 40 includes a first discharging electrode 40a and a second discharging electrode 40b, which face each other. If electric power, e.g. alternating current, is applied to the first and second discharging electrodes 40a and 40b, first light beams $L_1$ are emitted from the discharging gas 35.

The discharging electrode 40 extends along the length of the vacuum tube 31, so that the illuminating light source 30 emits varying amounts of an electrical discharge along its length. The discharging electrode 40 has such a configuration that varying amounts of light, having the same wavelength, are emitted along the light emitting portion 31. The discharging electrode 40 can be have a generally hourglass-type shape That is, the discharging electrode 40 has a center portion having relatively less surface area and end portions having relatively more surface area. In other words, the discharging electrode has a width that increases from the center portion to the end portions thereof.

Figure 6:
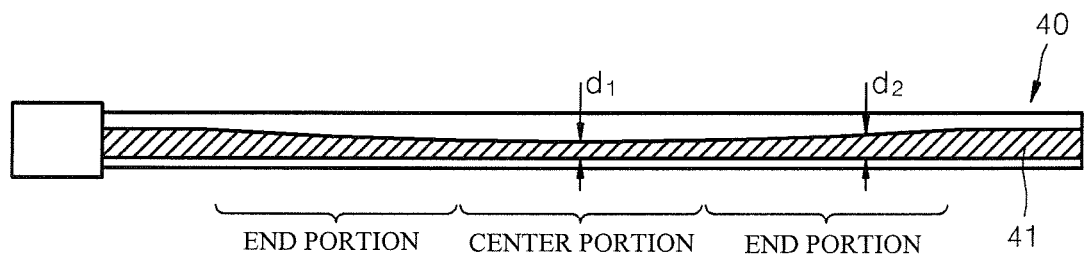
FIG. 6 is a schematic view of an electrode of an illuminating light source, according to an example embodiment of the present invention.

As shown in FIG. 6, a discharging electrode 41, according to an example embodiment of the present invention, has a thickness that increases from a center portion to end portions thereof. In FIG. 6, $d_1$ refers to a thickness of the center portion of the discharging electrode 41, and $d_2$ refers to a thickness of an end portion of the discharging electrode 41, with $d_2 > d_1$. If the thickness $d_2$ is larger than the thickness $d_1$, the emission amount of the first light beam $L_1$ increases towards the end of the discharging electrode 41, in accordance with a variation in the amount of electrical discharge produced therein. Accordingly, the variation in illumination intensity is used to compensate for variations in light intensities, due to the optical properties of a focusing lens, as discussed below.

Figure 7:
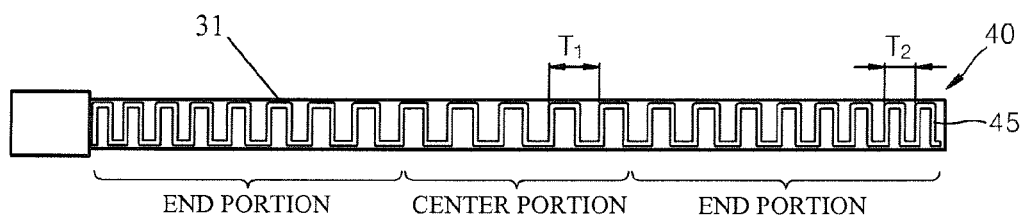
FIG. 7 is a schematic view of an electrode of an illuminating light source, according to another example embodiment of the present invention.

As shown in FIG. 7, a discharging electrode 45, according to another example embodiment of the present invention, is corrugated, and the corrugations extend along the width of the discharging electrode 45 and along the width of the vacuum tube 31. The frequency of the corrugations varies along the length of the discharging electrode 45. The frequency is higher at end portions and lower at a center portion, of the discharging electrode 45. $T_1$ is a frequency of a corrugation at the center portion of the discharging electrode 45, and $T_2$ is a frequency of a corrugation at one of the end portions of the discharging electrode 45. $T_1 < T_2$ because the $T_2$ is a higher frequency than the frequency $T_1$. More light is emitted at the end portions than at the center portion, of the discharging electrode 45, due to the higher frequency of the corrugations. Accordingly, the variation in the illumination intensity is used to compensate for variations in light intensities, due to the optical properties of a focusing lens, as discussed below.

Referring again to FIG. 5, the fluorescent body 33 is disposed on the inner perimeter of the vacuum tube 31, but is not disposed on the light emitting portion 31a. The fluorescent body 33 absorbs the first light beams $L_1$, emitted by the discharging gas 35, and emits second light beams $L_2$, that have a longer wavelength than the first light beams $L_1$. For example, the first light beams $L_1$ may include ultraviolet rays, and the second light beams $L_2$ may include visible rays. The discharging gas 35 is excited by discharge energy generated by electric power, e.g. alternating current applied to the discharging electrode 40. Thus, the fluorescent body 33 emits the second light beams $L_2$.

The illuminating light source 30 may further include a protection tube 37 disposed on the vacuum tube 31 and the discharging electrode 40. The protection tube 37 can be a transparent heat-shrinkable tube that allows the second light beams $L_2$ to pass there through. The protection tube 37 protects the vacuum tube 31 and electrically insulates the discharging electrode 40 from the external environment.

The illuminating light source 30 compensates for the decreased light amount focused on the edges of a light sensor and produces a image on the sensor that has a uniform light intensity, without lowering light use efficiency. The discharging electrode 40 can be substituted with discharging electrodes 41 and 45. Unlike a conventional illuminating light source, the illuminating light source 30, according to example embodiments of the present invention shown in FIG. 4 and FIG. 6, does not use a non-reflective pattern to compensate for the light amount difference. Instead, the illuminating source 30 increases the light intensity at end portions thereof, to compensate for light lost during focusing, thereby preventing the light efficiency from being lowered.

Figure 4:
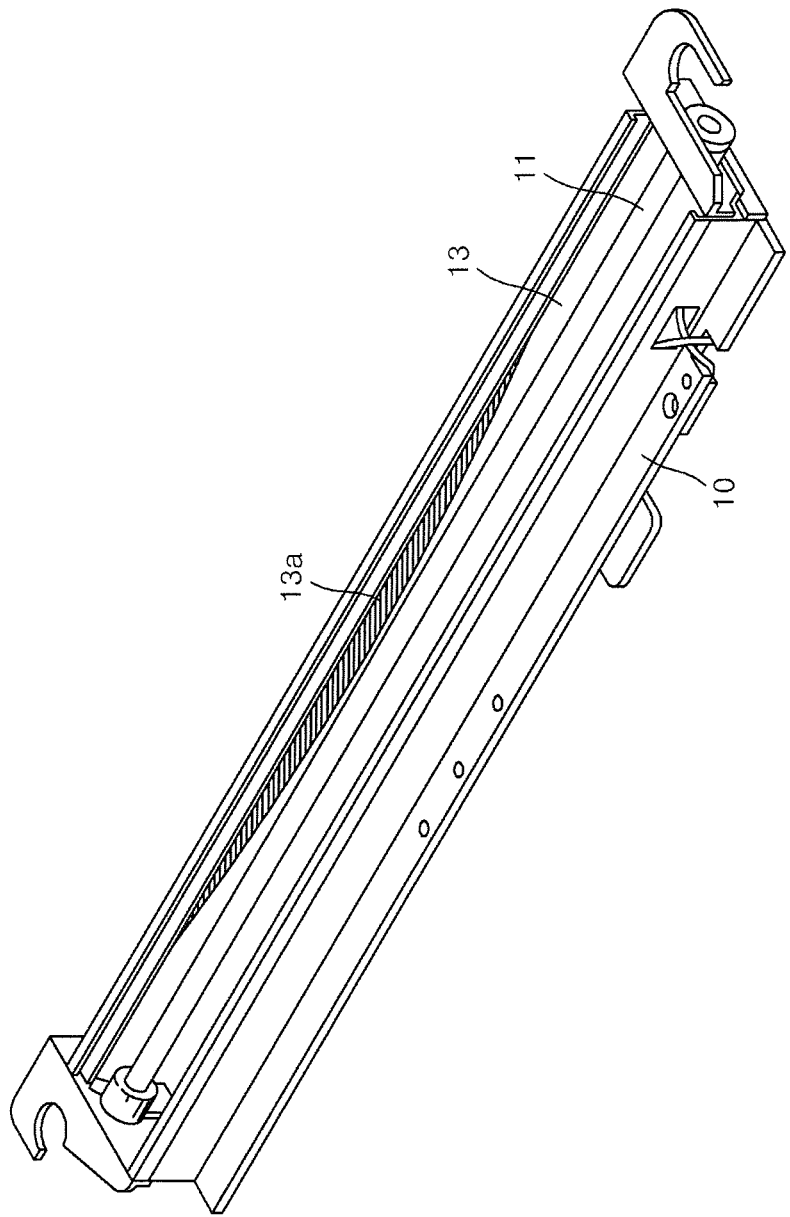
FIG. 4 is a perspective view of a conventional illuminating light source for use in an image scanning apparatus.
Figure 8:
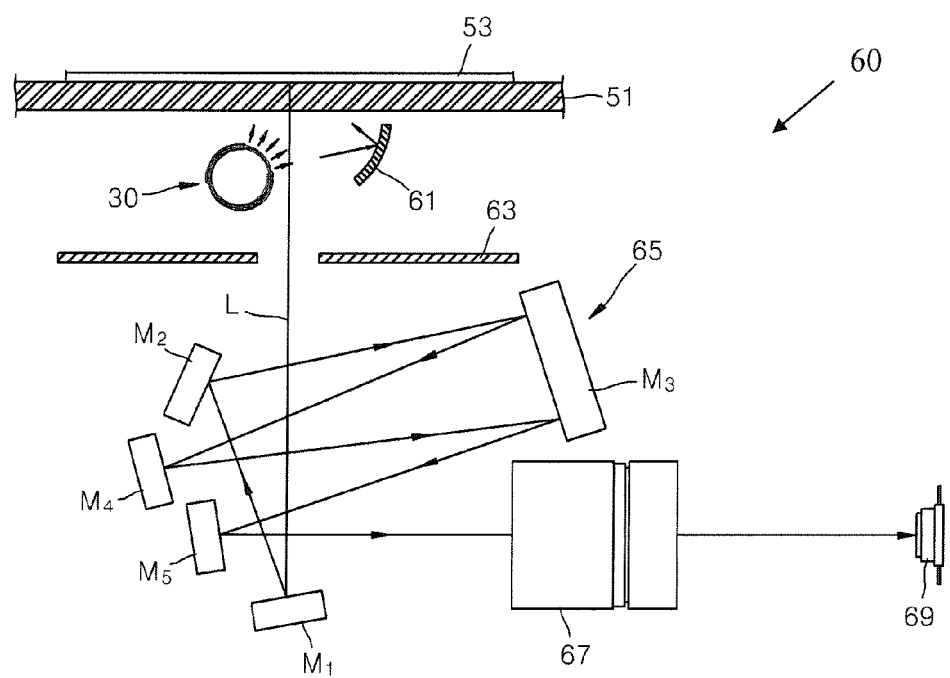
FIG. 8 illustrates an optical arrangement of a scanner module, according to an example embodiment of the present invention.

Referring to FIG. 8, a scanner module 60, according to the example embodiment of the present invention, includes an illuminating light source 30 as shown, for example, in FIG. 4 and FIG. 6, an imaging lens 67, and a sensor 69. The illuminating light source 30 illuminates an object 53, e.g., a document, a printed medium, or the like, is disposed on a cover glass 51. The configuration of the illuminating light source 30 can be substantially the same as shown in FIGS. 5 to 7.

The illuminating light source 30 may be disposed in a position so as not to block an optical path L, of light reflected from the object 53. The scanner module 60 may further include a reflection mirror 61, disposed between the illuminating light source 30 and the cover glass 51, to illuminate a predetermined part of the object 53, by reflecting light from the illuminating light source 30. In this case, the reflection mirror 61 reflects the light, radially emitted by the illuminating light source 30, toward the object 53.

The imaging lens 67 is disposed on the optical path L, between the cover glass 51 and the sensor 69, and is to form an image on the sensor 69, by focusing the light reflected from the object 53. The sensor 69 includes a charge coupled device (CCD), and detects the light beam focused by the imaging lens 67. Other optical sensors can be used instead of the CCD to detect light from the imaging lens 67.

A plurality of reflection mirrors 65 may be provided between the object 53 and the imaging lens 67. The reflection mirrors 65 at least partially define the optical path L, in a predetermined space, from the object 53 to the sensor 69. The reflection mirrors 65 can be used to produce a compact scanner module 60.

According to the example embodiment of the present invention, the reflection mirrors 65 include first to fifth reflection mirrors $M_1$, $M_2$, $M_3$, $M_4$, and $M_5$. The third reflection mirror $M_3$ can be a multiple reflection mirror, to reflect light in the optical path L at least twice, at different positions thereof. The light in the optical path L is reflected from the object 53 and is sequentially reflected by the first reflection mirror $M_1$, the second reflection mirror $M_2$, the third reflection mirror $M_3$, the fourth reflection mirror $M_4$, the third reflection mirror $M_3$, and the fifth reflection mirror $M_5$, and is then directed to the imaging lens 67.

Five reflection mirrors 65 are shown in FIG. 8, but the present teachings are not limited thereto. Alternatively, the number of the reflection mirrors 65 may be varied, as necessary. Also, any or none of the reflection mirrors may be multiple reflection mirrors. The third reflection mirror $M_3$ is not required to reflect the light twice.

The scanner module 60 may further include a light window 63, to control the light in the optical path L. The light window 63 is disposed between the illuminating light source 30 and the plurality of reflection mirrors 65. The light window 63 blocks light reflected from the object 51 that is outside the optical path L, i.e., scattered or inefficient light. The light that is not blocked by the light window 63, corresponding to a real image of the object 51, travels along the optical path L.

The scanner module 60 employs the illuminating light source 30 having the improved electrode configuration, and thus, eliminates the light intensity differences due to the optical characteristics of the imaging lens 67, and provides for an increased light efficiency.

Figure 9:
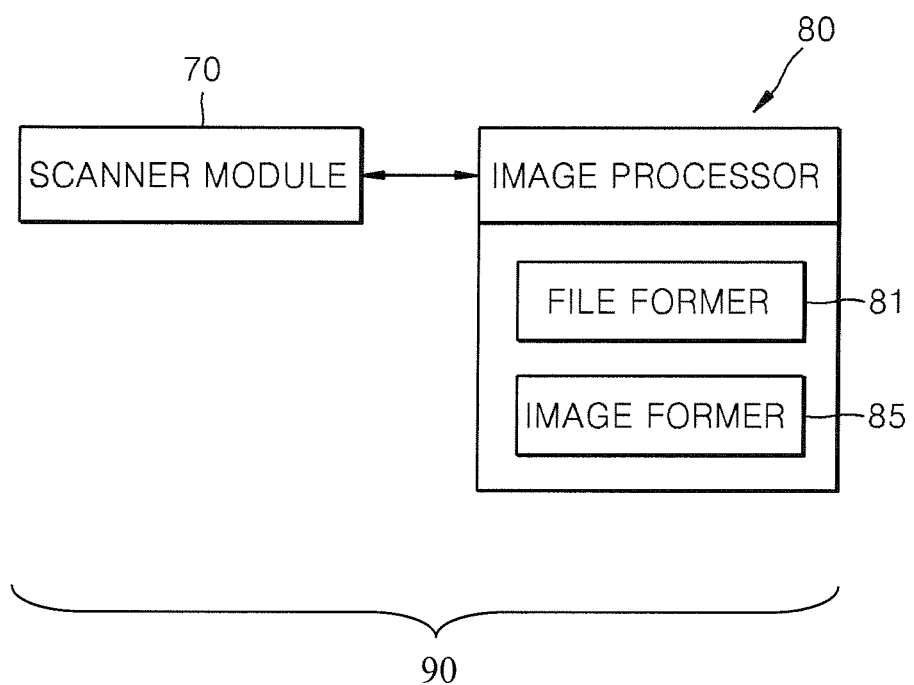
FIG. 9 is a block diagram of an image scanning apparatus, according to an example embodiment of the present invention.

Referring to FIG. 9, an image scanning apparatus 90, according to an example embodiment of the present invention, includes a scanner module 70 and an image processor 80. The image processor 80 processes the image information provided by the scanner module 70, to form an image. The image scanning apparatus 90 can be a printer, a digital photocopier, a scanner, a facsimile machine, a multi-function produce, a combination thereof, and the like. The scanner module 70 can be substantially the same as the scanner module 60 shown in FIG. 8.

The image processor 80 includes: a file former 81, which forms a real image file from the image information provided by the scanner module 70; and an image former 85, which forms an image on a printing medium using the real image file. The image scanning apparatus 90 includes the scanner module 70, which has the illuminating light source, with the improved electrode configuration as describe above, eliminates the light intensity differences between the center and the edges of a real image, due to the optical characteristics of the imaging lens, and prevents the light efficiency from being reduced. Thus, the image scanning apparatus improves image quality during image processing.

As described above, the illuminating light source 30, the scanner module 60, and the image scanning apparatus 90 may compensate for light intensity variations by using the taught electrode configurations. Thus, the light amount difference between the center and the edges of a real image may be compensated for. As additional optical elements are not provided to compensate for the light amount difference, the overall configuration of the image scanning apparatus can be compact.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. An illuminating light source, comprising:
 a cylindrical vacuum tube filled with a discharging gas, having opposing ends, and having a light emitting portion extending between the opposing ends;
 a first discharging electrode disposed upon the vacuum tube, having a center portion, and opposing end portions disposed at the opposing ends of the vacuum tube; and
 a fluorescent body disposed within the vacuum tube, to absorb first light beams emitted by the discharging gas and to emit second light beams having a longer wavelength than the first light beams through the light emitting portion,
 wherein a thickness of the first discharging electrode increases from the center portion to the end portions,
 wherein the first discharging electrode comprises a serpentine corrugation; and
 wherein the distance between serpentine corrugation loops decreases from center portion to the end portions.

2. The illuminating light source according to claim 1, further comprising a second discharging electrode disposed in opposition to the first discharging electrode.

3. The illuminating light source according to claim 2, wherein the second discharging electrode has a thickness that increases from the center portion to the end portions.

4. The illuminating light source according to claim 2, wherein the second discharging electrode is corrugated, and a frequency of the corrugations increases from the center portion to the end portions.

5. The illuminating light source according to claim 1, further comprising a protection tube disposed around the vacuum tube and the first discharging electrode.

6. A scanner module to scan an object, comprising:
 an illuminating light source according to claim 1, to illuminate the object;
 a sensor to detect light reflected from the object; and
 an imaging lens disposed on an optical path between the object and the sensor, to focus the light on the sensor.

7. The scanner module according to claim 6, further comprising a second discharging electrode disposed in opposition to the first discharging electrode.

8. The scanner module according to claim 7, wherein the second discharging electrode has a thickness that increases from the center portion to the end portions.

9. The scanner module according to claim 7, wherein the second discharging electrode is corrugated, and a frequency of the corrugations increases from the center portion to the end portions.

10. The scanner module according to claim 6, further comprising a protection tube disposed around the vacuum tube and the first discharging electrode.

11. The scanner module according to claim 6, further comprising a plurality of reflection mirrors at least partially defining the optical path between the object and the imaging lens.

12. The scanner module according to claim 11, further comprising a light window disposed between the illuminating light source and the plurality of reflection mirrors.

13. An image scanning apparatus, comprising:
a scanner module according to claim 6, and
an image processor to processes information provided by the scanner module into an image.

14. An illuminating light source, comprising:
a cylindrical vacuum tube filled with a discharging gas, having opposing ends, and having a light emitting portion extending between the opposing ends;
a first discharging electrode disposed upon the vacuum tube, having a center portion, and opposing end portions disposed at the opposing ends of the vacuum tube; and
a fluorescent body disposed within the vacuum tube, to absorb first light beams emitted by the discharging gas and to emit second light beams having a longer wavelength than the first light beams through the light emitting portion,
wherein the first discharging electrode is corrugated and wherein a frequency of the corrugations varies along the first discharging electrode such that frequency of the corrugations at the end portions is greater than the frequency of the corrugations at the center portion to allow for more light to be emitted by the end portions;
wherein the first discharging electrode corrugation takes the shape of a serpentine corrugation, such that the distance between serpentine corrugation loops decreases from center portion to the end portions.

15. The illuminating light source according to claim 14, further comprising a second discharging electrode disposed in opposition to the first discharging electrode.

16. The illuminating light source according to claim 15, wherein the second discharging electrode has a thickness that increases from the center portion to the end portions.

17. The illuminating light source according to claim 15, wherein the second discharging electrode is corrugated, and a frequency of the corrugations increases from the center portion to the end portions.

18. The illuminating light source according to claim 14, further comprising a protection tube disposed around the vacuum tube and the first discharging electrode.

19. A scanner module to scan an object, comprising:
an illuminating light source according to claim 14, to illuminate the object;
a sensor to detect light reflected from the object; and
an imaging lens disposed on an optical path between the object and the sensor, to focus the light on the sensor.

20. The scanner module according to claim 19, further comprising a second discharging electrode disposed in opposition to the first discharging electrode.

21. The scanner module according to claim 20, wherein the second discharging electrode has a thickness that increases from the center portion to the end portions.

22. The scanner module according to claim 20, wherein the second discharging electrode is corrugated, and a frequency of the corrugations increases from the center portion to the end portions.

23. The scanner module according to claim 19, further comprising a protection tube disposed around the vacuum tube and the first discharging electrode.

24. The scanner module according to claim 19, further comprising a plurality of reflection mirrors at least partially defining the optical path between the object and the imaging lens.

25. The scanner module according to claim 24, further comprising a light window disposed between the illuminating light source and the plurality of reflection mirrors.

26. An image scanning apparatus, comprising:
a scanner module according to claim 19, and
an image processor to processes information provided by the scanner module into an image.

* * * * *